United States Patent
Lee et al.

(10) Patent No.: US 10,212,728 B2
(45) Date of Patent: Feb. 19, 2019

(54) METHOD FOR REORDERING A PACKET DATA CONVERGENCE PROTOCOL PACKET DATA UNIT AT A USER EQUIPMENT IN A DUAL CONNECTIVITY SYSTEM AND DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 69 days.

(21) Appl. No.: 15/118,163

(22) PCT Filed: Feb. 27, 2015

(86) PCT No.: PCT/KR2015/001931
§ 371 (c)(1),
(2) Date: Aug. 11, 2016

(87) PCT Pub. No.: WO2015/133767
PCT Pub. Date: Sep. 11, 2015

(65) Prior Publication Data
US 2017/0181185 A1    Jun. 22, 2017

Related U.S. Application Data

(60) Provisional application No. 61/946,867, filed on Mar. 2, 2014.

(51) Int. Cl.
*H04W 72/12* (2009.01)
*H04W 80/02* (2009.01)

(52) U.S. Cl.
CPC ....... *H04W 72/1289* (2013.01); *H04W 80/02* (2013.01)

(58) Field of Classification Search
CPC .................. H04W 72/1289; H04W 80/02
See application file for complete search history.

(56) References Cited

U.S. PATENT DOCUMENTS

2012/0093127 A1  4/2012  Suzuki
2012/0281564 A1* 11/2012  Zhang .............. H04L 1/08
                                                370/252

(Continued)

FOREIGN PATENT DOCUMENTS

KR    10-2012-0128078    11/2012

OTHER PUBLICATIONS

PCT International Application No. PCT/KR2015/001931, Written Opinion of the International Searching Authority dated Jun. 8, 2015, 17 pages.

*Primary Examiner* — Raj Jain
*Assistant Examiner* — Harry H Kim
(74) *Attorney, Agent, or Firm* — Lee Hong Degerman Kang Waimey

(57) ABSTRACT

The present invention relates to a wireless communication system. More specifically, the present invention relates to a method and a device for re-ordering a PDCP PDU in a dual connectivity system, the method comprising: receiving a first PDCP PDU from a first RLC entity of a radio bearer; starting a reordering function if the first PDCP PDU is detected to be out of sequence; storing the first PDCP PDU in the PDCP entity; receiving a second PDCP PDU from a first RLC entity or a second RLC entity while the reordering function is running; and delivering at least one stored PDCP PDU with an associated COUNT value less than x+1 in ascending order of an associated COUNT value to an upper layer, if the second PDCP PDU is received from a second RLC entity.

10 Claims, 21 Drawing Sheets

(56) References Cited

U.S. PATENT DOCUMENTS

2013/0010688 A1* 1/2013 Yi .................... H04L 1/1829
                                                                           370/328

2013/0170496 A1   7/2013 Kim et al.

\* cited by examiner

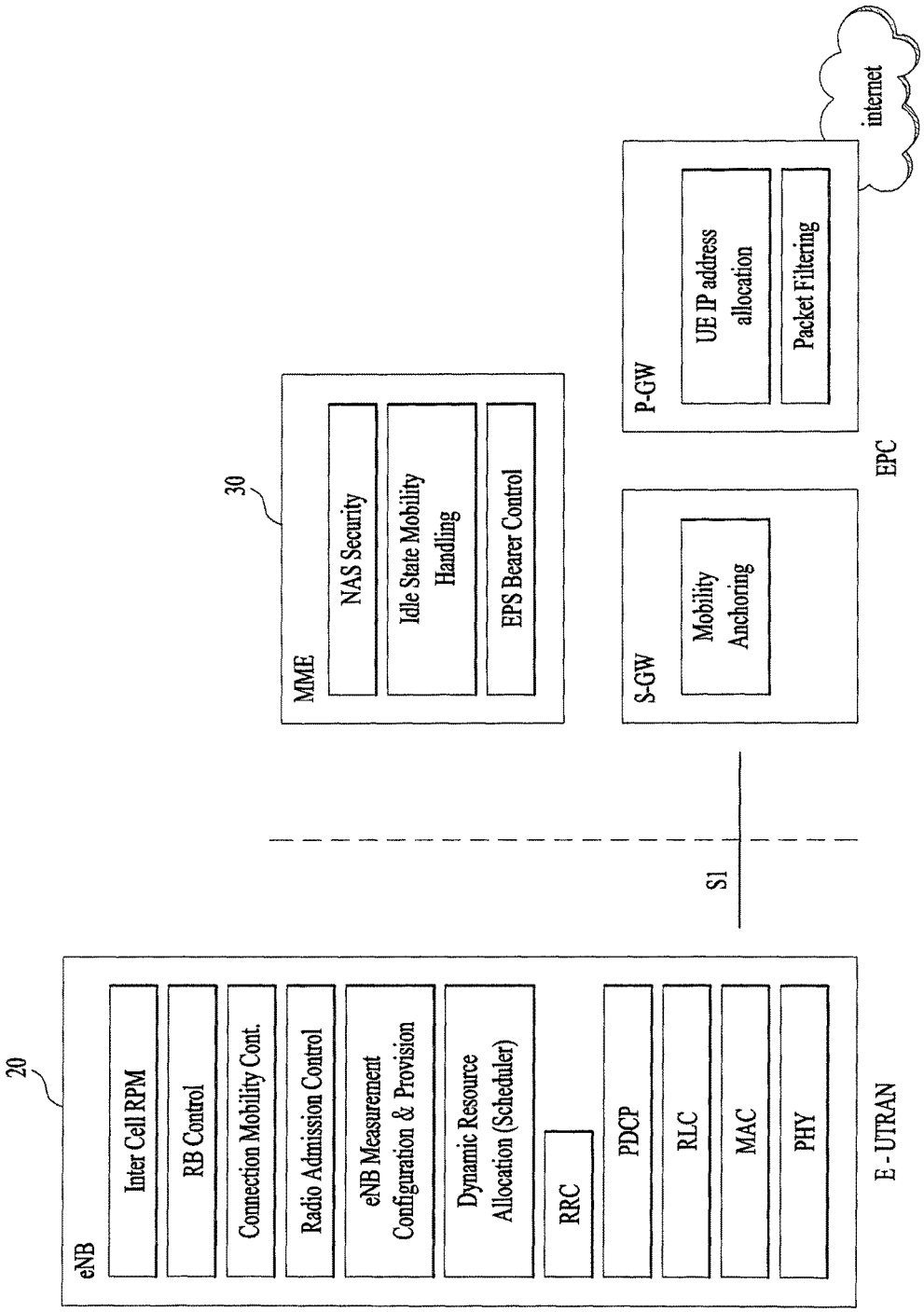

(a) Control-Plane Protocol Stack (b) User-Plane Protocol Stack

Component carrier 5 component carriers → 100 MHz (a) C-Plane connectivity of eNBs involved in dual connectivity (b) U-Plane connectivity of eNBs involved in dual connectivity

METHOD FOR REORDERING A PACKET DATA CONVERGENCE PROTOCOL PACKET DATA UNIT AT A USER EQUIPMENT IN A DUAL CONNECTIVITY SYSTEM AND DEVICE THEREFOR

CROSS-REFERENCE TO RELATED APPLICATIONS

This application is the National Stage filing under 35 U.S.C. 371 of International Application No. PCT/KR2015/001931, filed on Feb. 27, 2015, which claims the benefit of U.S. Provisional Application No. 61/946,867, filed on Mar. 2, 2014, the contents of which are all hereby incorporated by reference herein in their entirety.

TECHNICAL FIELD

The present invention relates to a wireless communication system and, more particularly, to a method for re-ordering a PDCP PDU at a UE in a dual connectivity system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for re-ordering a PDCP PDU in a dual connectivity system if the PDCP PDU is detected to be out of sequence. The technical problems solved by the present invention are not limited to the above technical problems and those skilled in the art may understand other technical problems from the following description.

Technical Solution

The object of the present invention can be achieved by providing a method for a User Equipment (UE) operating in a wireless communication system, the method comprising: receiving a first PDCP (Packet Data Convergence Protocol) PDU (Protocol Data Unit) from a first RLC (Radio Link Control) entity of a radio bearer comprising a PDCP entity and two RLC entities; starting a reordering function if the first PDCP PDU is detected to be out of sequence; storing the first PDCP PDU in the PDCP entity; receiving a second PDCP PDU from the first RLC entity or the second RLC entity while the reordering function is running, wherein a COUNT value associated with the second PDCP PDU is x; and delivering at least one stored PDCP PDU with an associated COUNT value less than x+1 in ascending order of an associated COUNT value to an upper layer, if the second PDCP PDU is received from the second RLC entity.

In another aspect of the present invention, provided herein is a UE (User Equipment) for re-ordering a PDCP PDU in a wireless communication system, the UE comprising: an RF (Radio Frequency) module; and a processor configured to control the RF module, wherein the processor is configured to receive a first PDCP (Packet Data Convergence Protocol) PDU (Protocol Data Unit) from the first RLC entity of a radio bearer comprising a PDCP entity and two RLC (Radio Link Control) entities comprising a first RLC entity and a second RLC entity, to start a reordering function if the first PDCP PDU is detected to be out of sequence, to store the first PDCP PDU in the PDCP entity, to receive a second PDCP PDU from the first RLC entity or the second RLC entity while the reordering function is running, wherein a COUNT value associated with the second PDCP PDU is x, and to deliver at least one stored PDCP PDU with an associated COUNT value less than x+1 in ascending order of an associated COUNT value to an upper layer, if the second PDCP PDU is received from the second RLC entity.

Preferably, the method further comprises: storing the second PDCP PDU in the PDCP entity if the second PDCP PDU is received from the first RLC entity.

Preferably, the method further comprises: delivering all stored PDCP PDUs with consecutively associated COUNT values equal to or larger than x+1 to the upper layer.

Preferably, a timer starts if the reordering function starts.

Preferably, the timer stops if the first PDCP PDU is delivered to the upper layer.

Preferably, a COUNT value associated with a PDCP PDU is composed of a value of TX_HFN and a PDCP SN (Sequence Number) associated with the PDCP PDU, wherein the value of TX_HFN indicates a HFN (Hyper Frame Number) value for generation of the COUNT value used for PDCP PDUs for the PDCP entity.

It is to be understood that both the foregoing general description and the following detailed description of the present invention are exemplary and explanatory and are intended to provide further explanation of the invention as claimed.

Advantageous Effects

According to the present invention, re-ordering PDCP PDU can be efficiently performed in a dual connectivity system. It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2B is a block diagram depicting architecture of a typical E-UTRAN and a typical EPC;

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
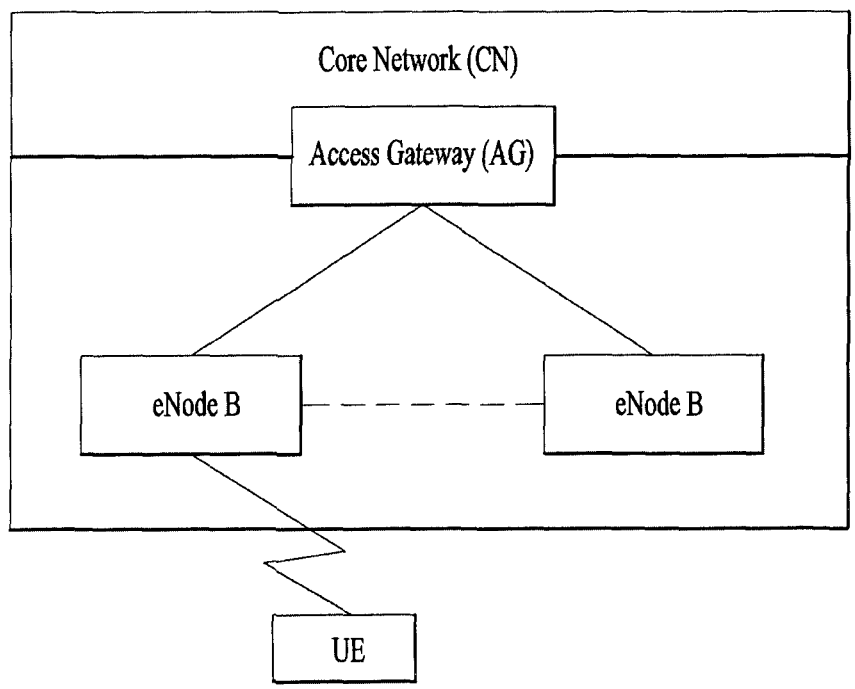
FIG. 1 is a diagram showing a network structure of an Evolved Universal Mobile Telecommunications System (E-UMTS) as an example of a wireless communication system.
Figure 2A:
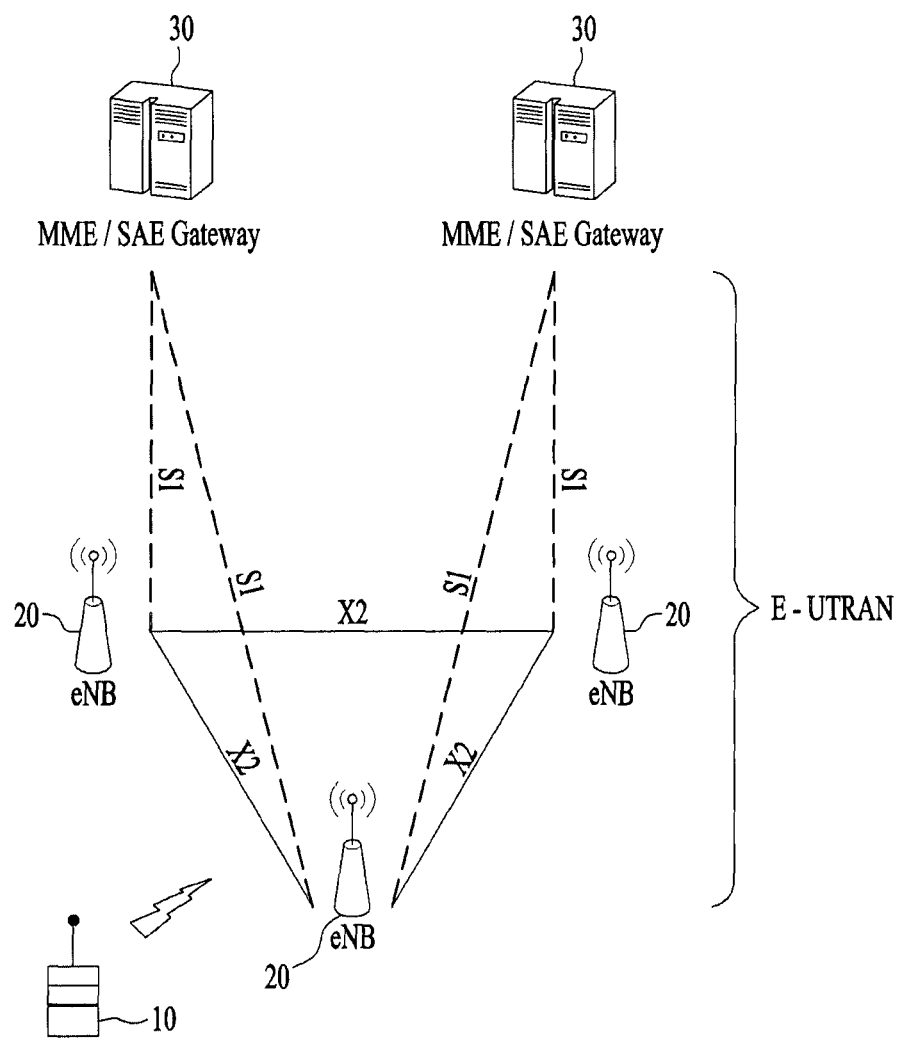
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
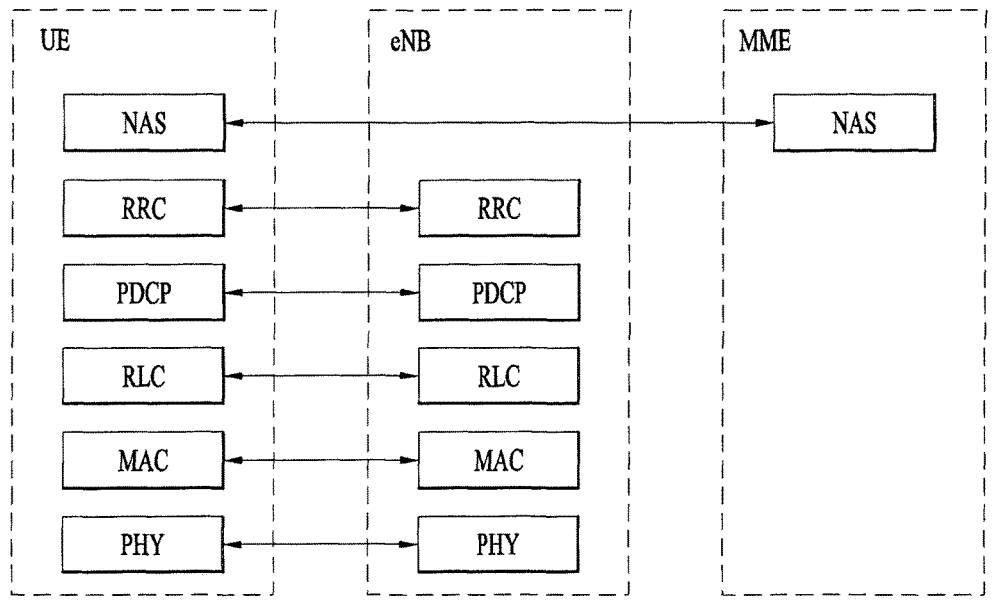
FIG. 3 is a diagram showing a control plane and a user plane of a radio interface protocol between a UE and an E-UTRAN based on a 3rd generation partnership project (3GPP) radio access network standard.
Figure 3:
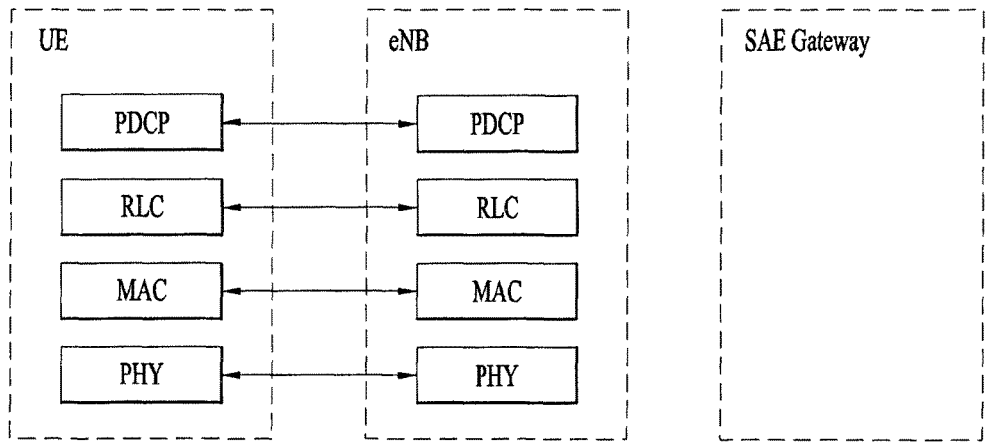

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
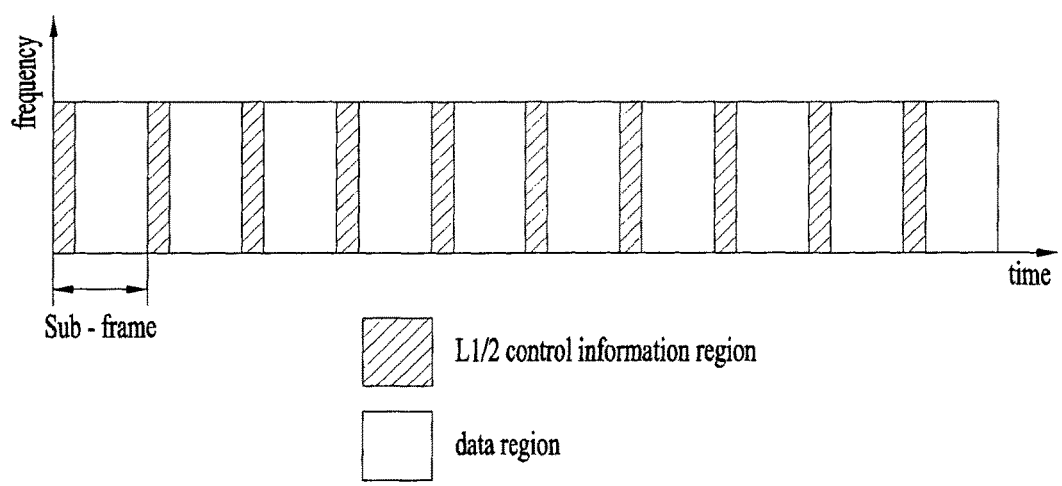
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
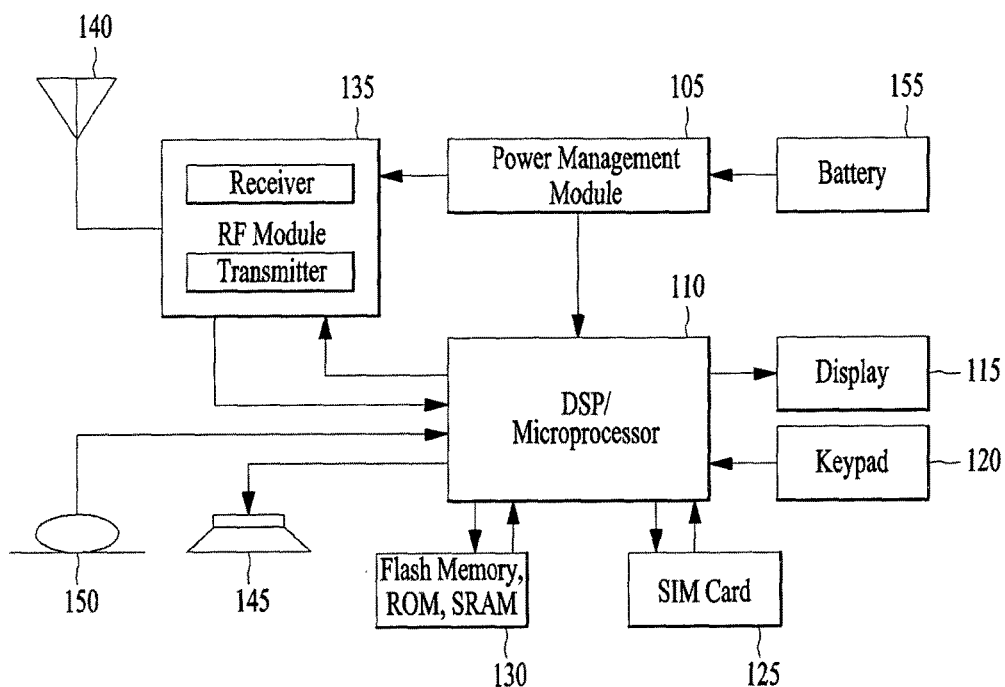
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
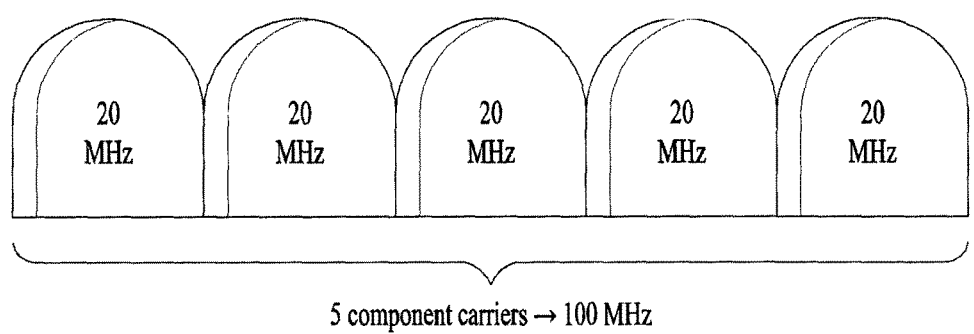
FIG. 6 is a diagram for carrier aggregation.

FIG. 6 is a diagram for carrier aggregation.

Carrier aggregation technology for supporting multiple carriers is described with reference to FIG. 6 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on noncontiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

Figure 7:
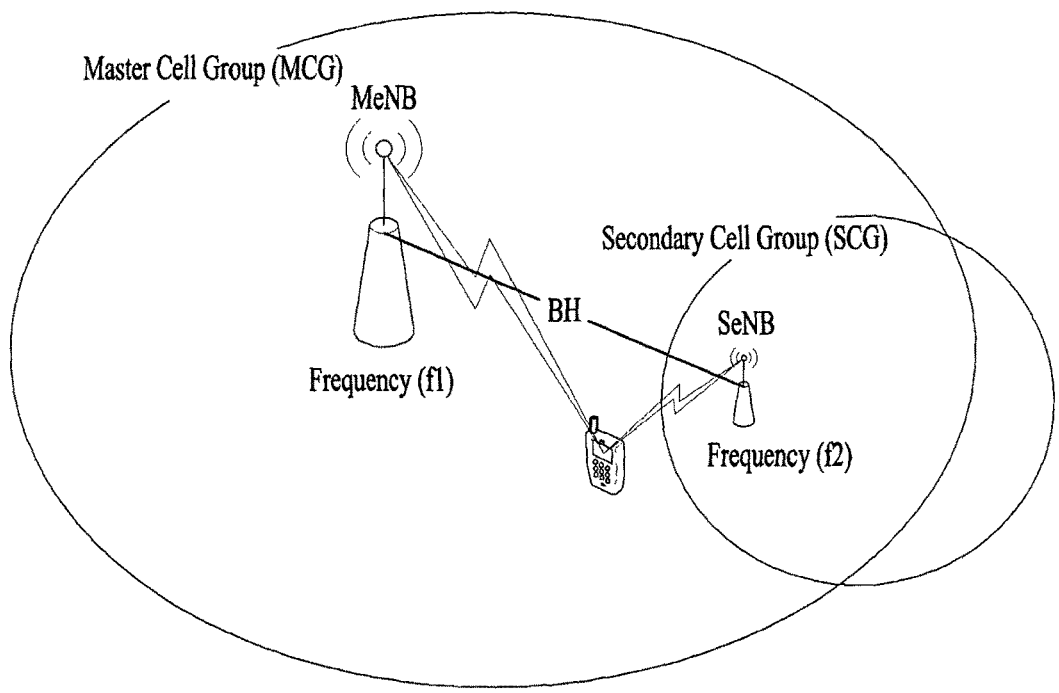
FIG. 7 is a conceptual diagram for dual connectivity between a Master Cell Group (MCS) and a Secondary Cell Group (SCG)

FIG. 7 is a conceptual diagram for dual connectivity (DC) between a Master Cell Group (MCS) and a Secondary Cell Group (SCG).

The dual connectivity means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

Figure 10:
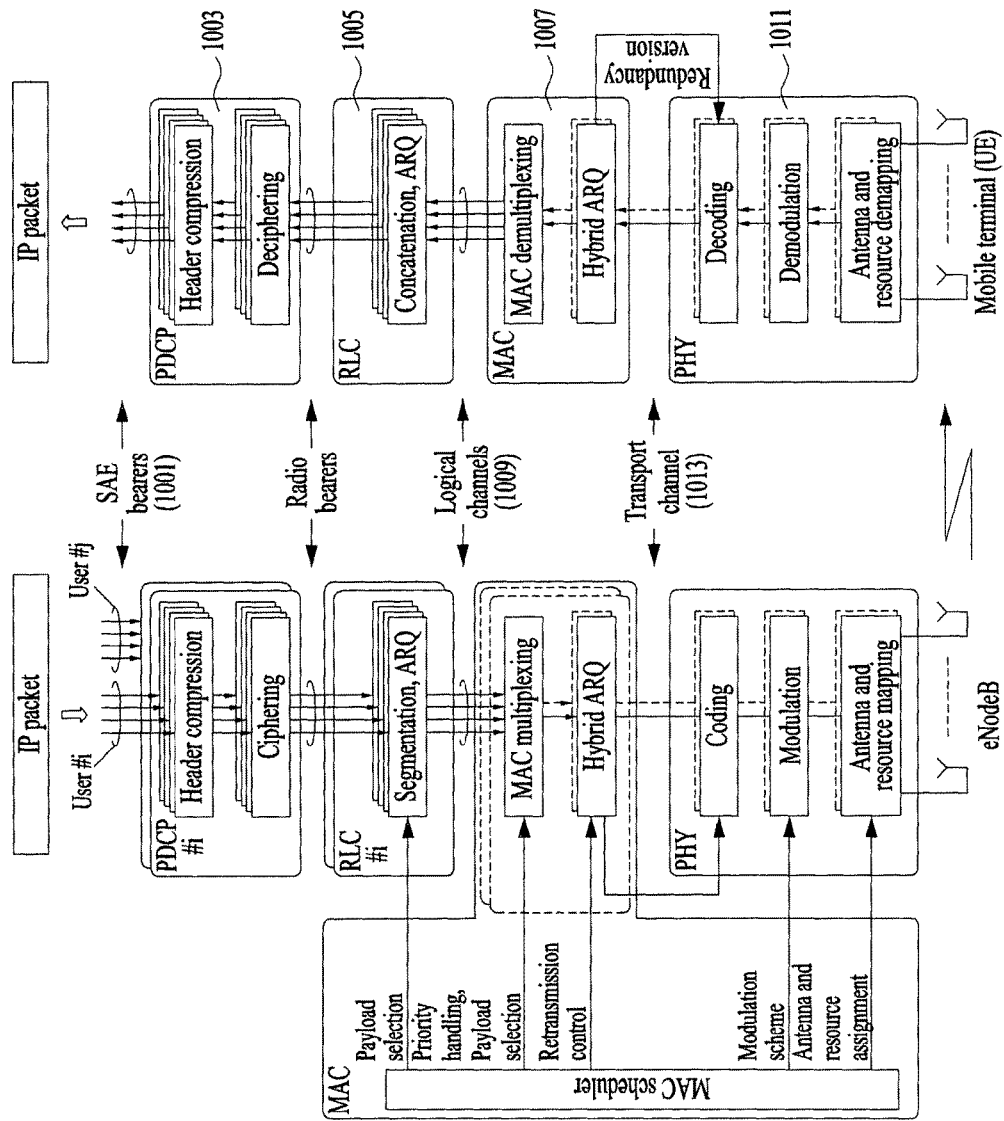
FIG. 10 is a diagram for a general overview of the LTE protocol architecture for the downlink.

The dual connectivity is a kind of carrier aggregation in that the UE is configured a plurality serving cells. However, unlike all serving cells supporting carrier aggregation of FIG. 8 are served by a same eNB, all serving cells supporting dual connectivity of FIG. 10 are served by different eNBs, respectively at same time. The different eNBs are connected via non-ideal backhaul interface because the UE is connected with the different eNBs at same time.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

Figure 8A:
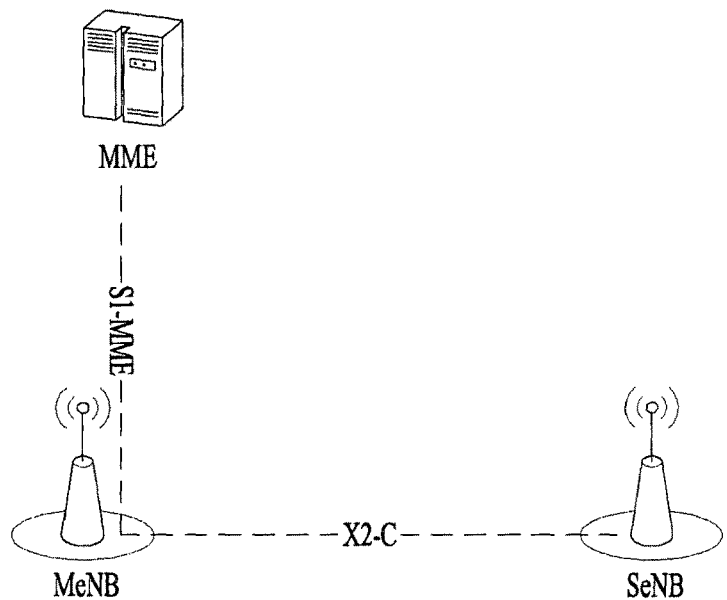
FIG. 8a is a conceptual diagram for C-Plane connectivity of base stations involved in dual connectivity.

FIG. 8a shows C-plane (Control Plane) connectivity of eNBs involved in dual connectivity for a certain UE: The MeNB is C-plane connected to the MME via S1-MME, the MeNB and the SeNB are interconnected via X2-C(X2-Control plane). As FIG. 8a, Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling.

Figure 8B:
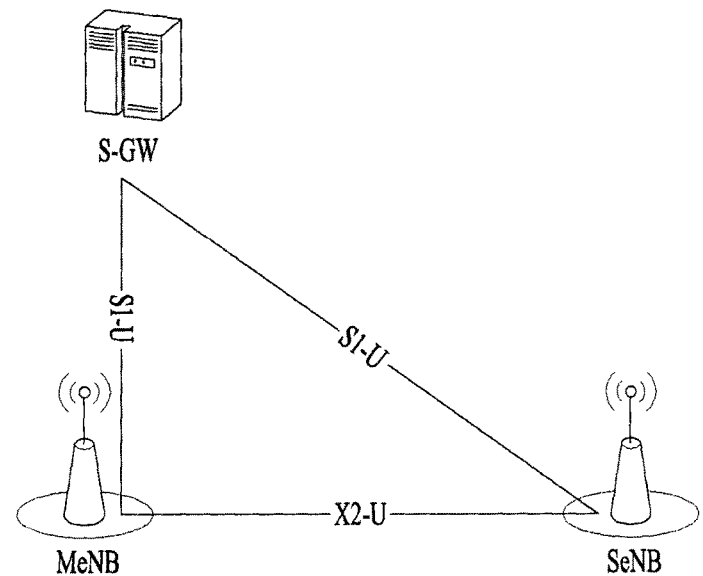
FIG. 8b is a conceptual diagram for U-Plane connectivity of base stations involved in dual connectivity.

FIG. 8b shows U-plane connectivity of eNBs involved in dual connectivity for a certain UE. U-plane connectivity depends on the bearer option configured: i) For MCG bearers, the MeNB is U-plane connected to the S-GW via S1-U, the SeNB is not involved in the transport of user plane data, ii) For split bearers, the MeNB is U-plane connected to the S-GW via S1-U and in addition, the MeNB and the SeNB are interconnected via X2-U, and iii) For SCG bearers, the SeNB is directly connected with the S-GW via S1-U. If only MCG and split bearers are configured, there is no S1-U termination in the SeNB. In the dual connectivity, enhancement of the small cell is required in order to data offloading from the group of macro cells to the group of small cells. Since the small cells can be deployed apart from the macro cells, multiple schedulers can be separately located in different nodes and operate independently from the UE point of view. This means that different scheduling node would encounter different radio resource environment, and hence, each scheduling node may have different scheduling results.

Figure 9:
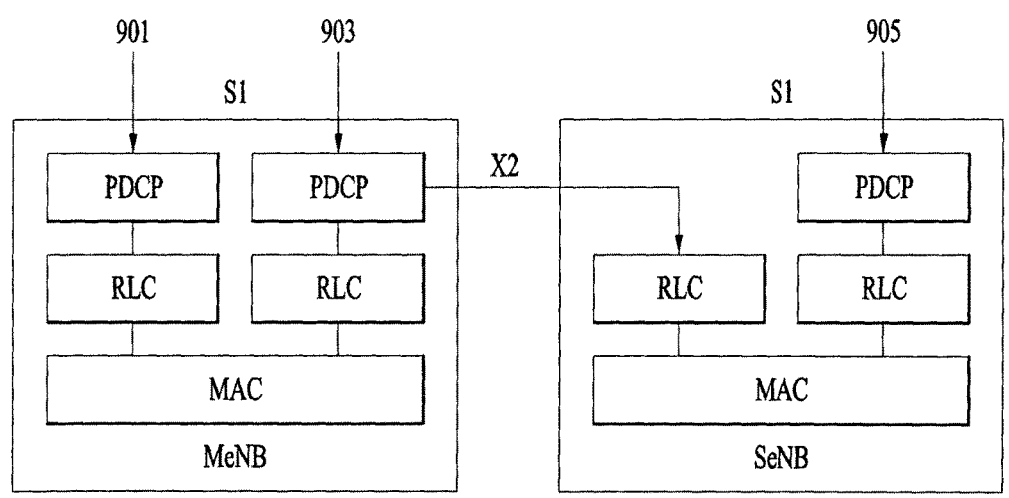
FIG. 9 is a conceptual diagram for radio protocol architecture for dual connectivity.

FIG. 9 is a conceptual diagram for radio protocol architecture for dual connectivity.

E-UTRAN of the present example can support dual connectivity operation whereby a multiple receptions/transmissions (RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity operation, the radio protocol architecture that a particular bearer uses depends on how the bearer is setup. Three alternatives exist, MCG bearer (901), split bearer (903) and SCG bearer (905). Those three alternatives are depicted on FIG. 9. The SRBs (Signaling Radio Bearers) are always of the MCG bearer and therefore only use the radio resources provided by the MeNB. The MCG bearer (901) is a radio protocol only located in the MeNB to use MeNB resources only in the dual connectivity. And the SCG bearer (905) is a radio protocol only located in the SeNB to use SeNB resources in the dual connectivity.

Specially, the split bearer (903) is a radio protocol located in both the MeNB and the SeNB to use both MeNB and SeNB resources in the dual connectivity and the split bearer (903) may be a radio bearer comprising one Packet Data Convergence Protocol (PDCP) entity, two Radio Link Control (RLC) entities and two Medium Access Control (MAC) entities for one direction. Specially, the dual connectivity operation can also be described as having at least one bearer configured to use radio resources provided by the SeNB.

The expected benefits of the split bearer (903) are: i) the SeNB mobility hidden to CN, ii) no security impacts with ciphering being required in MeNB only, iii) no data forwarding between SeNBs required at SeNB change, iv) offloads RLC processing of SeNB traffic from MeNB to SeNB, v) little or no impacts to RLC, vi) utilization of radio resources across MeNB and SeNB for the same bearer possible, vii) relaxed requirements for SeNB mobility (MeNB can be used in the meantime).

The expected drawbacks of the split bearer (903) are: i) need to route, process and buffer all dual connectivity traffic in the MeNB, ii) a PDCP entity to become responsible for routing PDCP PDUs towards eNBs for transmission and reordering them for reception, iii) flow control required between the MeNB and the SeNB, iv) in the uplink, logical channel prioritization impacts for handling RLC retransmissions and RLC Status PDUs (restricted to the eNB where the corresponding RLC entity resides) and v) no support of local break-out and content caching at SeNB for dual connectivity UEs.

In Dual Connectivity, two MAC entities are configured in the UE: one for the MCG and one for the SCG. Each MAC entity is configured by RRC with a serving cell supporting PUCCH transmission and contention based Random Access. The term SpCell refers to such cell, whereas the term SCell refers to other serving cells. The term SpCell either refers to the PCell of the MCG or the PSCell of the SCG depending on if the MAC entity is associated to the MCG or the SCG, respectively. A Timing Advance Group containing the SpCell of a MAC entity is referred to as pTAG, whereas the term sTAG refers to other TAGs.

The functions of the different MAC entities in the UE operate independently if not otherwise indicated. The timers and parameters used in each MAC entity are configured independently if not otherwise indicated. The Serving Cells, C-RNTI, radio bearers, logical channels, upper and lower layer entities, LCGs, and HARQ entities considered by each MAC entity refer to those mapped to that MAC entity if not otherwise indicated On the other hand, in the dual connectivity, one PDCP entity is configured in the UE. For one UE, there are two different eNBs that are connected via non-ideal backhaul X2. In case the split bearer (903) is transmitted to different eNBs (MeNB and SeNB), the SeNB forwards the PDCP PDU to the MeNB. Due to the delay over non-ideal backhaul, the PDCP PDUs are likely to be received out-of-sequence.

FIG. 10 is a diagram for a general overview of the LTE protocol architecture for the downlink.

A general overview of the LTE protocol architecture for the downlink is illustrated in FIG. 10. Furthermore, the LTE protocol structure related to uplink transmissions is similar to the downlink structure in FIG. 10, although there are differences with respect to transport format selection and multi-antenna transmission.

Data to be transmitted in the downlink enters in the form of IP packets on one of the SAE bearers (1001). Prior to transmission over the radio interface, incoming IP packets are passed through multiple protocol entities, summarized below and described in more detail in the following sections:

Packet Data Convergence Protocol (PDCP, 1003) performs IP header compression to reduce the number of bits necessary to transmit over the radio interface. The header-compression mechanism is based on ROHC, a standardized header-compression algorithm used in WCDMA as well as several other mobile-communication standards. PDCP (1003) is also responsible for ciphering and integrity protection of the transmitted data. At the receiver side, the PDCP protocol performs the corresponding deciphering and decompression operations. There is one PDCP entity per radio bearer configured for a mobile terminal.

Radio Link Control (RLC, 1005) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (1005) offers services to the PDCP (1003) in the form of radio bearers. There is one RLC entity per radio bearer configured for a terminal.

There is one RLC entity per logical channel configured for a terminal, where each RLC entity is responsible for: i) segmentation, concatenation, and reassembly of RLC SDUs; ii) RLC retransmission; and iii) in-sequence delivery and duplicate detection for the corresponding logical channel.

Other noteworthy features of the RLC are: (1) the handling of varying PDU sizes; and (2) the possibility for close interaction between the hybrid-ARQ and RLC protocols. Finally, the fact that there is one RLC entity per logical channel and one hybrid-ARQ entity per component carrier implies that one RLC entity may interact with multiple hybrid-ARQ entities in the case of carrier aggregation.

The purpose of the segmentation and concatenation mechanism is to generate RLC PDUs of appropriate size from the incoming RLC SDUs. One possibility would be to define a fixed PDU size, a size that would result in a compromise. If the size were too large, it would not be possible to support the lowest data rates. Also, excessive padding would be required in some scenarios. A single small PDU size, however, would result in a high overhead from the header included with each PDU. To avoid these drawbacks, which is especially important given the very large dynamic range of data rates supported by LTE, the RLC PDU size varies dynamically.

In process of segmentation and concatenation of RLC SDUs into RLC PDUs, a header includes, among other fields, a sequence number, which is used by the reordering and retransmission mechanisms. The reassembly function at the receiver side performs the reverse operation to reassemble the SDUs from the received PDUs.

Medium Access Control (MAC, 1007) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (1007) offers services to the RLC (1005) in the form of logical channels (1009).

Physical Layer (PHY, 1011), handles coding/decoding, modulation/demodulation, multi-antenna mapping, and other typical physical layer functions. The physical layer (1011) offers services to the MAC layer (1007) in the form of transport channels (1013).

Figure 11:
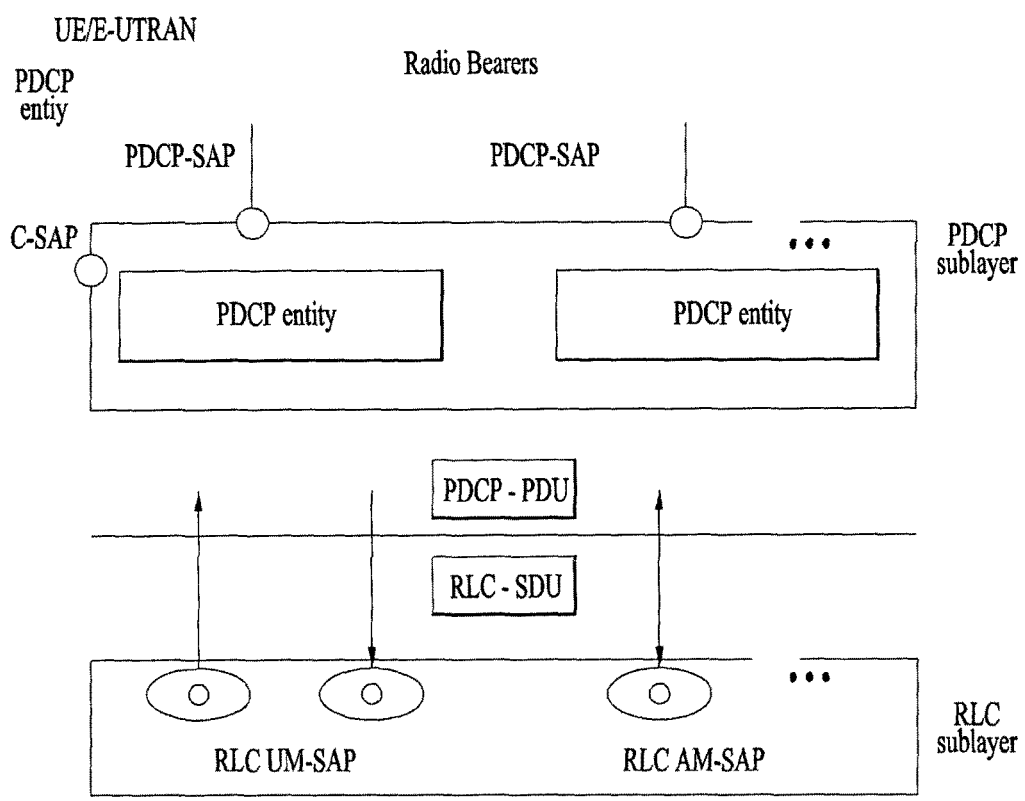
FIG. 11 is a conceptual diagram for a PDCP entity architecture.

FIG. 11 is a conceptual diagram for a PDCP entity architecture.

FIG. 11 represents one possible structure for the PDCP sublayer, but it should not restrict implementation. Each RB (i.e. DRB and SRB, except for SRB0) is associated with one PDCP entity. Each PDCP entity is associated with one or two (one for each direction) RLC entities depending on the RB characteristic (i.e. uni-directional or bi-directional) and RLC mode. The PDCP entities are located in the PDCP sublayer. The PDCP sublayer is configured by upper layers.

Figure 12:
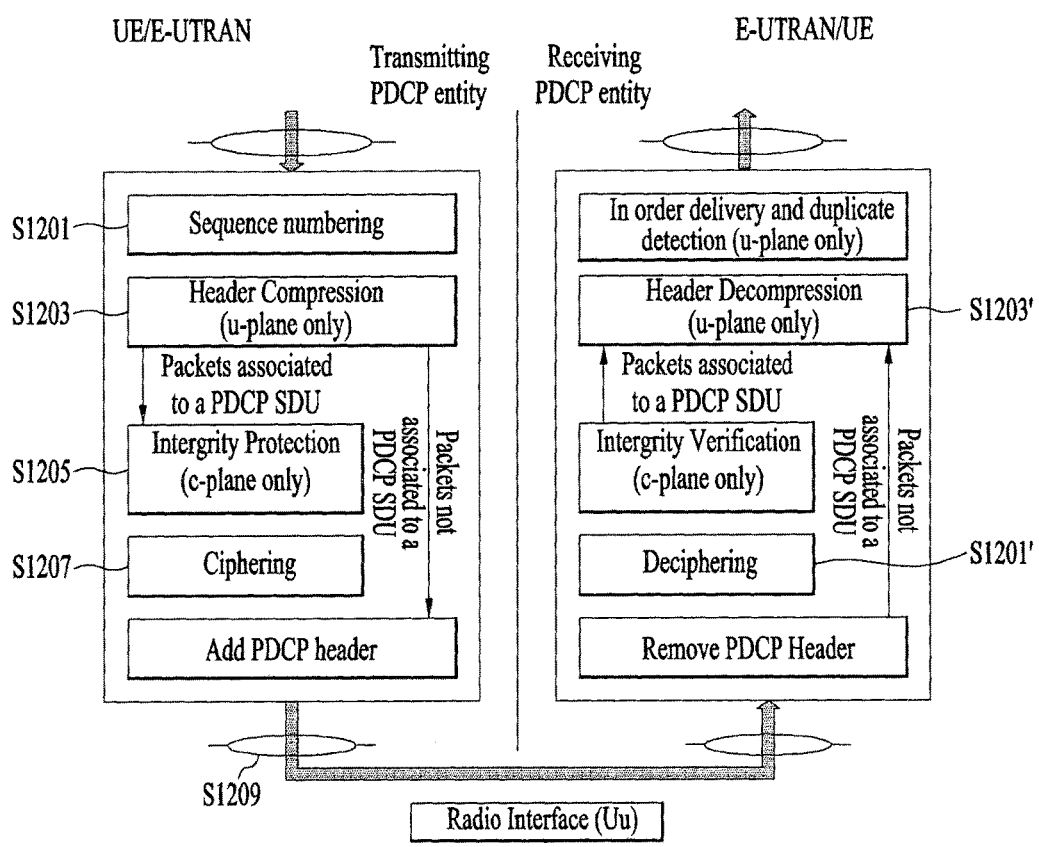
FIG. 12 is a conceptual diagram for functional view of a PDCP entity.

FIG. 12 is a conceptual diagram for functional view of a PDCP entity.

The PDCP entities are located in the PDCP sublayer. Several PDCP entities may be defined for a UE. Each PDCP entity carrying user plane data may be configured to use header compression. Each PDCP entity is carrying the data of one radio bearer. In this version of the specification, only the robust header compression protocol (ROHC), is supported. Every PDCP entity uses at most one ROHC compressor instance and at most one ROHC decompressor instance. A PDCP entity is associated either to the control plane or the user plane depending on which radio bearer it is carrying data for.

FIG. 12 represents the functional view of the PDCP entity for the PDCP sublayer, it should not restrict implementation. For RNs, integrity protection and verification are also performed for the u-plane.

UL Data Transfer Procedures:

At reception of a PDCP SDU from upper layers, the UE may start a discard timer associated with the PDCP SDU. For a PDCP SDU received from upper layers, the UE may associate a PDCP SN (Sequence Number) corresponding to Next_PDCP_TX_SN to the PDCP SDU (S1201), perform header compression of the PDCP SDU (S1203), perform integrity protection (S1205) and ciphering using COUNT based on TX_HFN and the PDCP SN associated with this PDCP SDU (S1207), increment the Next_PDCP_TX_SN by one, and submit the resulting PDCP Data PDU to lower layer (S1209).

If the Next_PDCP_TX_SN is greater than Maximum_PDCP_SN, the Next_PDCP_TX_SN is set to '0' and TX_HFN is incremented by one.

DL Data Transfer Procedures:

For DRBs mapped on RLC AM, at reception of a PDCP Data PDU from lower layers, the UE may decipher the PDCP PDU using COUNT based on RX_HFN-1 and the received PDCP SN if received PDCP SN-Last_Submitted_PDCP_RX_SN>Reordering_Window or 0≤Last_Submitted_PDCP_RX_SN-received PDCP SN<Reordering_Window and if received PDCP SN>Next_PDCP_RX_SN.

If received PDCP SN<Next_PDCP_RX_SN, the UE may decipher the PDCP PDU using COUNT based on RX_HFN and the received PDCP SN (S1201'). And the UE may perform header decompression and discard this PDCP SDU (S1203').

If Next_PDCP_RX_SN-received PDCP SN>Reordering_Window, the UE may increment RX_HFN by one, use COUNT based on RX_HFN and the received PDCP SN for deciphering the PDCP PDU and set Next_PDCP_RX_SN to the received PDCP SN+1.

If received PDCP SN-Next_PDCP_RX_SN≥Reordering_Window, the UE may use COUNT based on RX_HFN-1 and the received PDCP SN for deciphering the PDCP PDU.

If received PDCP SN>Next_PDCP_RX_SN, the UE may use COUNT based on RX_HFN and the received PDCP SN for deciphering the PDCP PDU, set Next_PDCP_RX_SN to the received PDCP SN+1 and if Next_PDCP_RX_SN is larger than Maximum_PDCP_SN, the UE may set Next_PDCP_RX_SN to 0 and increment RX_HFN by one.

If received PDCP SN<Next_PDCP_RX_SN, the UE may use COUNT based on RX_HFN and the received PDCP SN for deciphering the PDCP PDU.

If the PDCP PDU has not been discarded in the above, the UE may perform deciphering and header decompression for the PDCP PDU, respectively.

If a PDCP SDU with the same PDCP SN is stored, the UE may discard this PDCP SDU. And if a PDCP SDU with the same PDCP SN is not stored, the UE may store the PDCP SDU.

If the PDCP PDU received by PDCP is not due to the re-establishment of lower layers, the UE may deliver to upper layers in ascending order of the associated COUNT value: i) all stored PDCP SDU(s) with an associated COUNT value less than the COUNT value associated with the received PDCP SDU ii) all stored PDCP SDU(s) with consecutively associated COUNT value(s) starting from the COUNT value associated with the received PDCP SDU, and the UE may set Last_Submitted_PDCP_RX_SN to the PDCP SN of the last PDCP SDU delivered to upper layers.

Else if received PDCP SN=Last_Submitted_PDCP_RX_SN+1 or received PDCP SN=Last_Submitted_PDCP_RX_SN−Maximum_PDCP_SN, the UE may deliver to upper layers in ascending order of the associated COUNT value: all stored PDCP SDU(s) with consecutively associated COUNT value(s) starting from the COUNT value associated with the received PDCP SDU.

And the UE may set Last_Submitted_PDCP_RX_SN to the PDCP SN of the last PDCP SDU delivered to upper layers.

Figure 13:
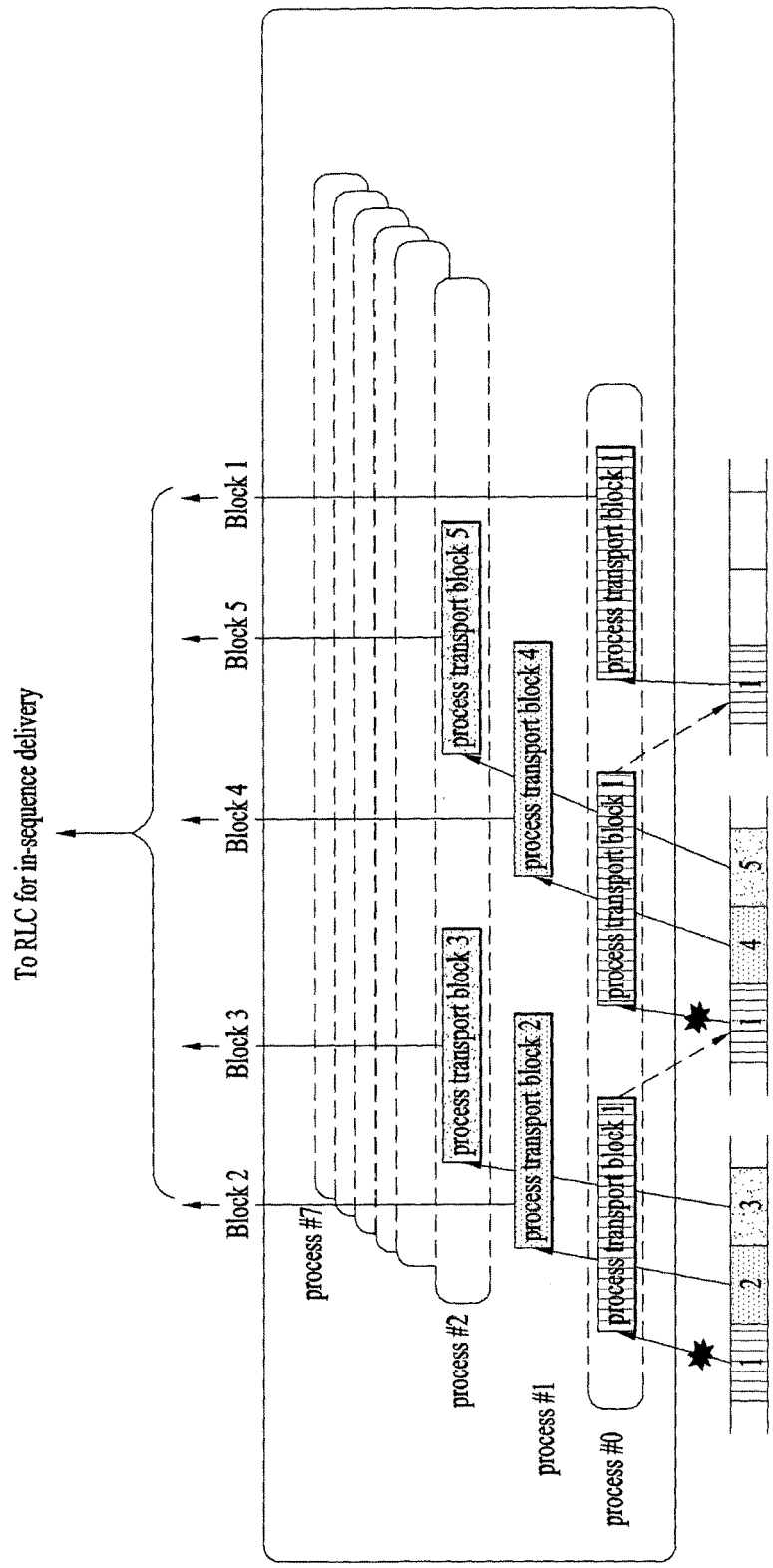
FIG. 13 is a conceptual diagram for multiple parallel hybrid-ARQ processes in RLC entity.

FIG. 13 is a conceptual diagram for multiple parallel hybrid-ARQ processes in RLC entity.

Hybrid ARQ with soft combining provides robustness against transmission errors. As hybrid-ARQ retransmissions are fast, many services allow for one or multiple retransmissions, thereby forming an implicit (closed loop) rate-control mechanism. The hybrid-ARQ protocol is part of the MAC layer, while the actual soft combining is handled by the physical layer.

Obviously, hybrid ARQ is not applicable for all types of traffic. For example, broadcast transmissions, where the same information is intended for multiple terminals, typically do not rely on hybrid ARQ. Hence, hybrid ARQ is only supported for the DL-SCH and the ULSCH, although its usage is optional.

The LTE hybrid-ARQ protocol uses multiple parallel stop-and-wait processes. Upon reception of a transport block, the receiver makes an attempt to decode the transport block and informs the transmitter about the outcome of the decoding operation through a single acknowledgement bit indicating whether the decoding was successful or if a retransmission of the transport block is required. Clearly, the receiver must know to which hybrid-ARQ process a received acknowledgement is associated. This is solved by using the timing of the acknowledgement for association with a certain hybrid-ARQ process. Note that, in the case of TDD operation, the time relation between the reception of data in a certain hybrid-ARQ process and the transmission of the acknowledgement is also affected by the uplink/downlink allocation.

The use of multiple parallel hybrid-ARQ processes, illustrated in FIG. 13, for each user can result in data being delivered from the hybrid-ARQ mechanism out of sequence. For example, transport block 5 in the figure was successfully decoded before transport block 1 which required retransmissions. In-sequence delivery of data is therefore ensured by the RLC layer. The same reordering mechanism in the RLC is also used to handle in-sequence delivery across multiple component carriers in the case of carrier aggregation. As mentioned above, the hybrid-ARQ retransmissions are handled independently per component carrier, which may result in out-of-sequence delivery in a similar way as within a component carrier.

Downlink retransmissions may occur at any time after the initial transmission—that is, the protocol is asynchronous—and an explicit hybrid-ARQ process number is used to indicate which process is being addressed. In an asynchronous hybrid-ARQ protocol, the retransmissions are in principle scheduled similarly to the initial transmissions. Uplink retransmissions, on the other hand, are based on a synchronous protocol, the retransmission occurs at a predefined time after the initial transmission and the process number can be implicitly derived. In a synchronous protocol the time instant for the retransmissions is fixed once the initial transmission has been scheduled, which must be accounted for in the scheduling operation. However, note that the scheduler knows from the hybrid-ARQ entity in the eNodeB whether a terminal will perform a retransmission or not.

In-sequence delivery implies that data blocks are delivered by the receiver in the same order as they were transmitted. This is an essential part of RLC; the hybrid-ARQ processes operate independently and transport blocks may therefore be delivered out of sequence, as seen in FIG. 13. In-sequence delivery implies that SDU n should be delivered prior to SDU n+1. This is an important aspect as several applications require the data to be received in the same order as it was transmitted. TCP can, to some extent, handle IP packets arriving out of sequence, although with some performance impact, while for some streaming applications in-sequence delivery is essential. The basic idea behind in-sequence delivery is to store the received PDUs in a buffer until all PDUs with lower sequence number have been delivered. Only when all PDUs with lower sequence number have been used for assembling SDUs is the next PDU used. RLC retransmission, provided when operating in acknowledged mode only, operates on the same buffer as the in-sequence delivery mechanism.

In the previous art, there is only one type of bearer, which is mapped to one RLC entity and one PDCP entity. The RLC entity is responsible for in-order delivery of data to the upper layer (PDCP entity), hence the RLC entity in the receiver side performs reordering function to re-arrange the processing order of RLC Data PDUs. Since the RLC entity transmits the data in-order to the PDCP entity, the PDCP entity always receives the data in-order.

When the UE is configured with dual connectivity, for split bearer, two RLC entities and one PDCP entity are used as shown in FIG. 9. In the receiver side, although each RLC entity performs reordering function for data of each RLC entity, the data may be received out of order in PDCP entity unless there is a close interaction between two RLC entities. If PDCP entity receives data out of order, header decompression may not be successful, thus the reordering function is newly introduced for the dual connectivity.

In the current specification, UM RLC performs reordering based on the reordering timer and reordering window. If the PDCP reordering is operated as in the RLC reordering function, the reordering timer starts upon detection of out-of-sequence PDCP PDU and limit the maximum waiting time for the missing PDCP PDU. Given that the current PDCP entity does not distinguish whether the received PDCP PDU is from RLC entity for MCG or SCG, there is a case that the PDCP entity waits the missing PDCP PDU until the reordering timer expiry and delays the in-order PDCP SDUs to upper layer.

Figure 14:
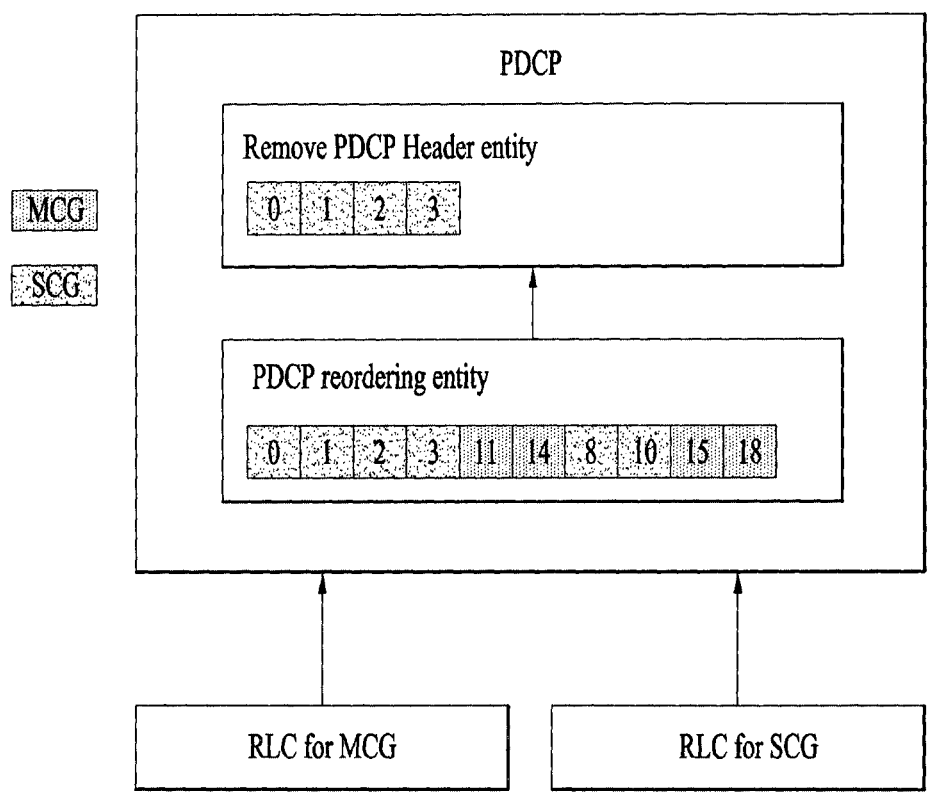
FIG. 14 is an example for excessive delay in delivery of PDCP SDUs due to reordering process in dual connectivity.

FIG. 14 is an example for excessive delay in delivery of PDCP SDUs due to reordering process in dual connectivity.

In FIG. 14, PDCP PDU with green box is received from the RLC for MCG while the PDCP PDU with yellow box is received from the RLC for SCG. The PDCP receives PDCP PDU with SN=0, 1, 2, 3 from RLC for SCG. Since PDCP PDU with SN=0, 1, 2, 3 are received in order, the PDCP delivers them to the PDCP Header Remove entity. The PDCP receives PDCP PDUs with SN=11, 14 from RLC for MCG. As there are out-of-sequence PDCP PDUs (SN=4, 5, 6, 7, 8, 9, 10), the PDCP stores PDCP PDUs with SN=11, 14 in the reordering buffer. The PDCP receives PDCP PDUs with SN=8, 10 from RLC for SCG. At this point, since each RLC entity is responsible for in-order delivery, PDCP PDUs with SN=4, 5, 6, 7, 9 cannot be received any more either from RLC for MCG or RLC for SCG, given that PDCP PDU with SN=11 is received from RLC for MCG. In other words, PDCP PDUs with SN=4, 5, 6, 7, 9 are missing PDCP PDUs. However, in the current specification, the PDCP does not distinguish whether they are to be received further from the lower layers or they are missing PDCP PDUs. Therefore, the PDCP does not deliver in-order PDCP PDUs with SN=8, 10, 11 to the Remove PDCP Header. When the PDCP receives PDCP PDUs with SN=15, 18 from RLC for MCG, the PDCP still waits for PDCP PDUs with SN=4, 5, 6, 7, 9, 12, 13, 16, 17 and delivers the received in-order PDCP PDUs (SN=8, 10, 11, 14, 15, 18) upon reordering timer expiry.

In order to avoid excessive reordering delay, a new mechanism is needed that delivers the in-order PDCP PDUs considering if the missing PDCP PDUs cannot be further received from the lower layers and considered as lost PDCP PDUs.

Figure 15:
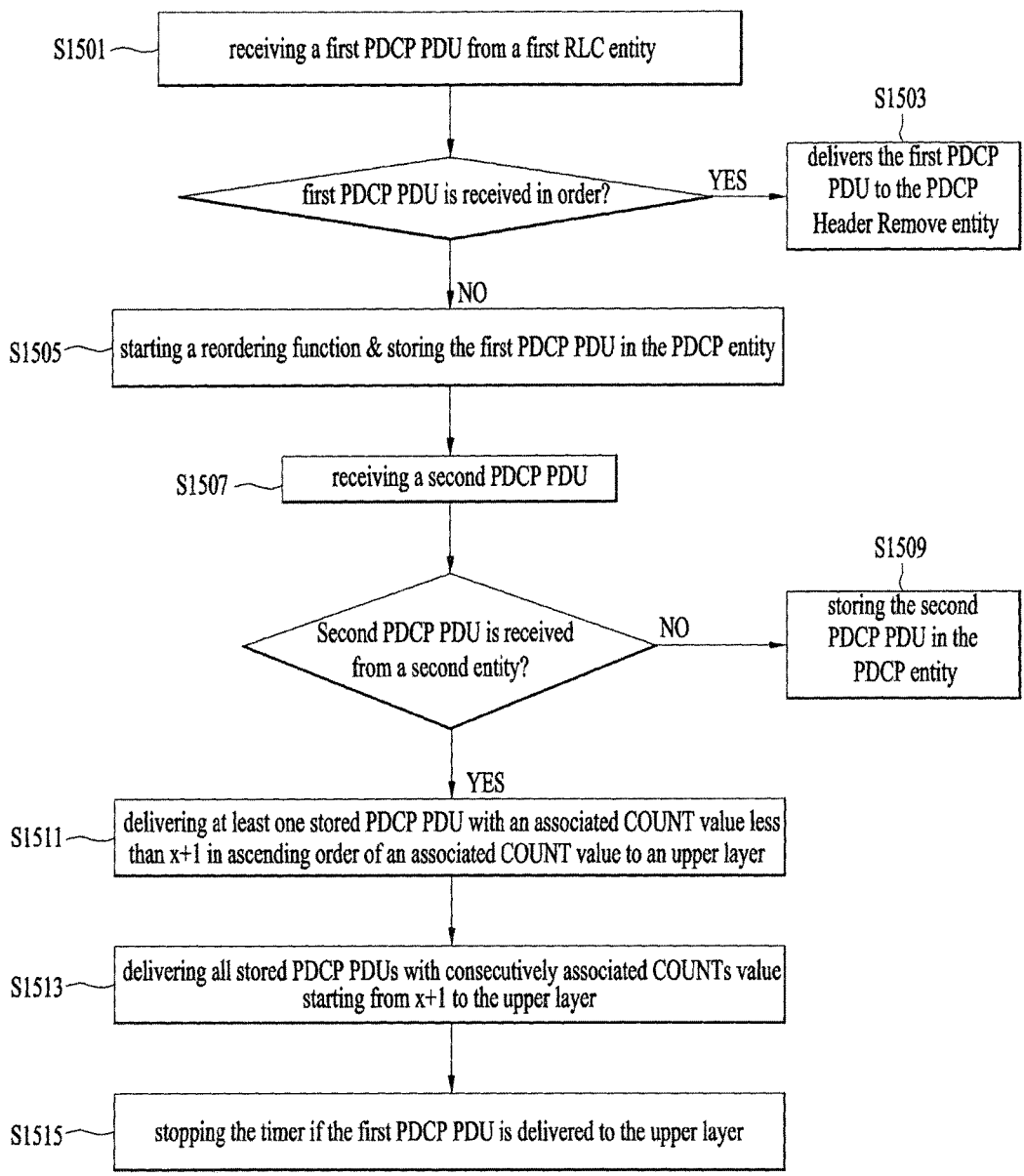
FIG. 15 is a conceptual diagram for re-ordering PDCP PDU in a dual connectivity system according to embodiments of the present invention.

FIG. 15 is a conceptual diagram for re-ordering PDCP PDU in a dual connectivity system according to embodiments of the present invention.

In this invention, for a bearer mapped to one PDCP entity and two RLC entities that deliver PDCP PDUs to the PDCP entity in ascending order of PDCP Sequence Numbers (preferably, a value of COUNT), in order to avoid excessive reordering delay of PDCP PDUs in the reordering buffer, the receiving PDCP entity checks for each RLC entity whether the PDCP PDUs that have not been received yet are lost or not based on the PDCP SN of the received PDCP PDU.

Regarding FIG. 15, when the UE is configured to a split radio bearer comprising a PDCP entity and two RLC entities comprising a first RLC entity and a second RLC entity, the UE receives a first PDCP PDU from the first RLC entity (S1501).

Preferably, the first RLC entity is for a MeNB and the second RLC entity is for a SeNB, vice versa.

If the first PDCP PDU is received in order, the PDCP entity delivers the first PDCP PDU to the PDCP Header Remove entity (S1503). On the other hands, if the first PDCP PDU is detected to be out of sequence, the PDCP entity starts a reordering function and store the first PDCP PDU in the PDCP entity (S1505).

Preferably, if the reordering function starts, a re-ordering timer starts.

When the second PDCP PDU is received while the reordering function is running, the UE checked whether the second PDCP PDU is received from the first RLC entity or the second RLC entity (S1507). A COUNT value associated with the second PDCP PDU is x.

Preferably, a COUNT value associated with a PDCP PDU is composed of a value of TX_HFN and a PDCP SN (Sequence Number) associated with the PDCP PDU, wherein the value of TX_HFN indicates a HFN (Hyper Frame Number) value for generation of the COUNT value used for PDCP PDUs for the PDCP entity.

If the second PDCP PDU is received from the first RLC entity, the UE may store the second PDCP PDU in the PDCP entity (S1509). Because there is a potential for receiving PDCP PDU with an associated COUNT value less than x to happen.

However, if second PDCP PDU is received from the second RLC entity, PDCP PDUs with an associated COUNT value less than x cannot be received any more either from the first RLC entity or the second RLC entity, in other words, PDCP PDUs with an associated COUNT value less than x are missing PDCP PDUs. Thus, the UE may deliver at least one stored PDCP PDU with an associated COUNT value less than x+1 in ascending order of an associated COUNT value to an upper layer (S1511). Also, if several PDCP PDUs are received from the second RLC entity when the second PDCP PDU is received from the second RLC entity, the UE may deliver all stored PDCP PDUs with consecutively associated COUNT values equal to or larger than x+1 to the upper layer (S1513).

And if the first PDCP PDU is delivered to the upper layer, the timer stated in step of S1505 stops (S1515).

FIG. 16 is an example for re-ordering PDCP PDU in a dual connectivity system according to embodiments of the present invention.

Figure 16A:
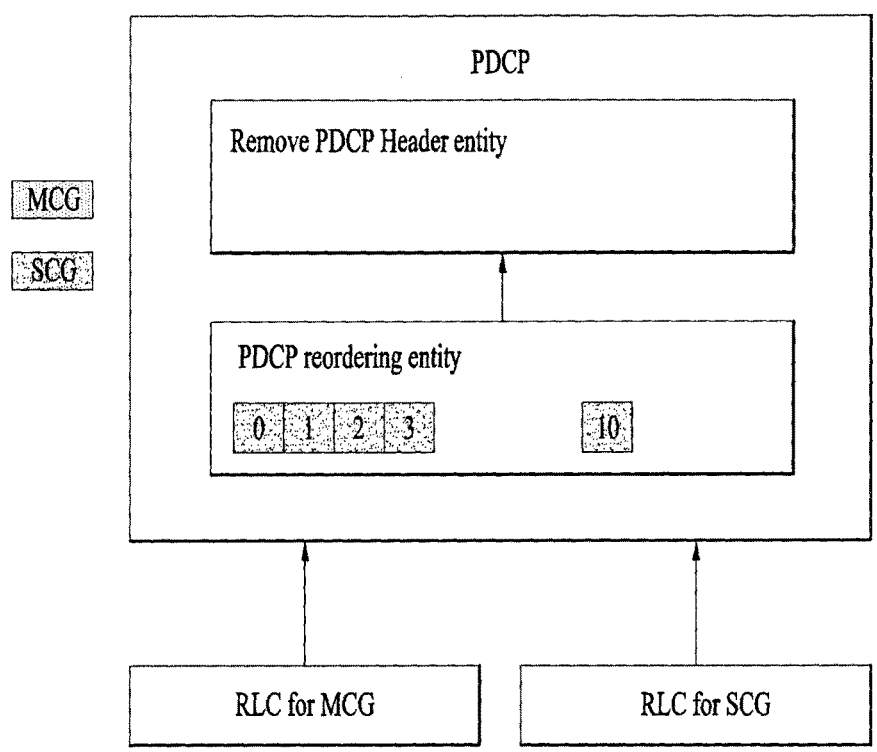
FIG. 16 is an example for re-ordering PDCP PDU in a dual connectivity system according to embodiments of the present invention.

Regarding FIG. 16A, the PDCP receives PDCP PDU with SN=1, 2, 3 from RLC for SCG. Since a PDCP PDU with SN=1 is received in out-of-order (PDCP PDU with SN=0 is not received yet), the PDCP stores PDCP PDUs with SN=1, 2, 3 in the reordering buffer. The PDCP receives PDCP PDUs with SN=10 from RLC for SCG. Because they are still out-of-order, the PDCP also stores PDCP PDUs with SN=10 in the reordering buffer.

Figure 16B:
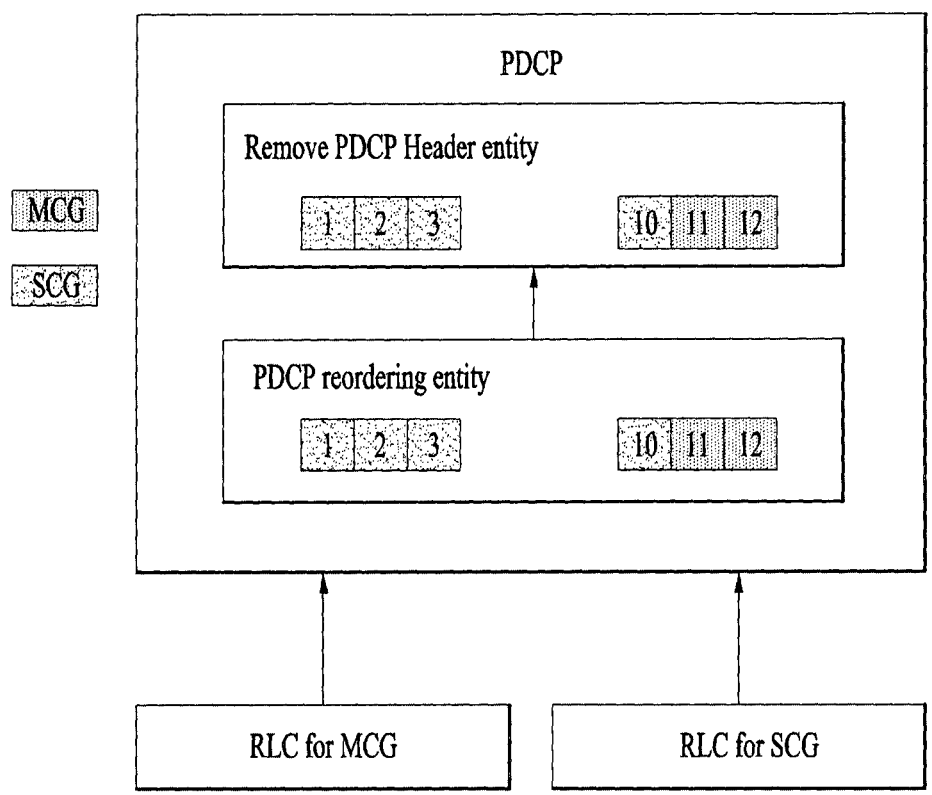

Meanwhile, regarding FIG. 16B, the PDCP receives PDCP PDU with SN=11, 12 from RLC for MCG. At this point, since each RLC entity is responsible for in-order delivery, PDCP PDUs with SN=4, 5, 6, 7, 8, 9 cannot be received any more either from RLC for MCG or RLC for SCG, given that PDCP PDU with SN=11 is received from RLC for MCG. In other words, PDCP PDUs with SN=4, 5, 6, 7, 8, 9 are missing PDCP PDUs. Thus, the UE may deliver all stored PDCP PDU with SN=1, 2, 3, 10, 11, 12 to an upper layer.

FIG. 17 examples for re-ordering PDCP PDU in a dual connectivity system according to embodiments of the present invention.

For performing re-ordering PDCP PDU in dual connectivity, the receiving PDCP entity manages two state variables for each RLC entity, i.e., 'Next Expected PDCP SN for RLC entity 1 (NEP1)' and 'Next Expected PDCP SN for RLC entity 2 (NEP2)'. The 'Next Expected PDCP SN' means the PDCP SN of the next PDCP PDU that is expected to be received in-sequence.

Although a parameter used for re-ordering function is a value of COUNT mentioned above, because the value of COUNT depends on PDCP SN of PDCP PDU, PDCP SN can be used instead of the value of COUNT in the re-ordering function. The parameter of 'a value of COUNT' appears to be used interchangeably with the parameter 'PDCP SN'.

When the receiving PDCP entity receives a PDCP PDU with PDCP SN=x where x≥minimum [NEP1, NEP2] from one of the two RLC entities, it updates either NEP1 or NEP2 to x+1 depending on the RLC entity from which the PDCP PDU is received. If updated minimum [NEP1, NEP2] is different from the previous minimum [NEP1, NEP2], the receiving PDCP entity considers all the missing PDCP PDUs with PDCP SN<updated minimum [NEP1, NEP2] within the Reordering Window are lost, and delivers PDCP PDUs stored in the reordering buffer with PDCP SN<updated minimum [NEP1, NEP2] within the Reordering Window to the upper functional entity in ascending order of PDCP SN.

Then, the receiving PDCP entity updates Reordering Window so that the Higher edge of the Reordering Window is equal to the maximum [NEP1, NEP2].

After that, the receiving PDCP entity performs additional operation such as further delivery of PDCP PDUs, further updates of NEP1 and NEP2, and stop/start/reset of reordering timer, based on the stored PDCP PDUs and state variables.

The invention is explained for different cases. In all example cases below, it is assumed that the PDCP SN of the received PDCP SN=x, and Lower edge=Higher edge−ReorderingWindowSize. The $NEP_{min}$ is the minimum of NEP1 and NEP2. $NEP_{max}$ is the maximum of NEP1 and NEP2. VRX is the value of PDCP SN following the PDCP SN of the PDCP PDU which triggered reordering timer. In the comparison, modular operation is used. The base of arithmetic comparison is lower edge of Reordering Window.

Figure 17A:
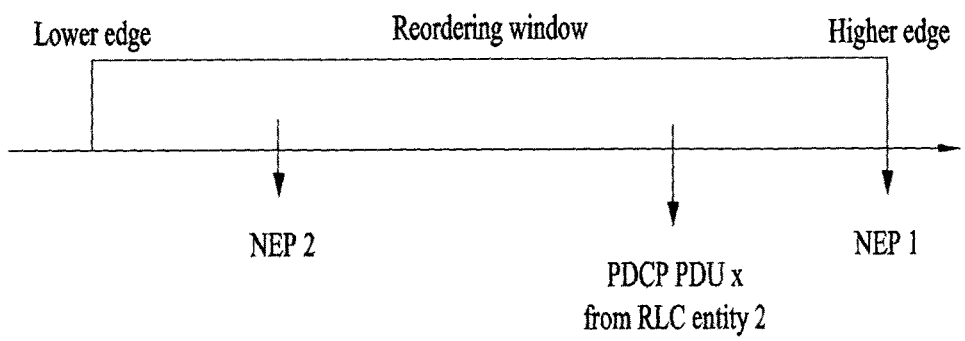
FIGS. 17A-17H are examples for re-ordering PDCP PDU in a dual connectivity system according to embodiments of the present invention.

FIG. 17A represents a case of PDCP PDU received from RLC entity 2, and NEP2≤x<NEP1.

Regarding FIG. 17A, if the PDCP entity receives PDCP PDU with PDCP SN=x from the RLC entity 2, where the PDCP SN x is NEP2≤x<NEP1, the PDCP entity stores the received PDCP PDU in the reordering buffer, updates NEP2 to x+1, considers the missing PDCP PDUs with PDCP SN where PDCP SN<$NEP_{min}$ (=NEP2) as lost, and delivers the stored PDCP PDUs with PDCP SN where PDCP SN<$NEP_{min}$ (=NEP2) to upper functional entity in ascending order of PDCP SN.

If the PDCP PDU with PDCP SN=NEP2 is stored, the PDCP entity delivers the consecutive PDCP PDUs with PDCP SN≥NEP2 to upper functional entity in ascending order of the PDCP SN, and to updates NEP2 to the PDCP SN of the first PDCP PDU with PDCP SN>NEP2 that has not been received. If reordering timer is running and If VRX-≤$NEP_{min}$; or If VRX falls outside of the reordering window and VRX is not equal to Higher edge, the PDCP entity stops and reset reordering timer.

If reordering timer is not running and if Higher edge>$NEP_{min}$, the PDCP entity starts reordering timer, and sets VRX=Higher edge.

If reordering timer expires or stops, the PDCP entity updates NEP1 and NEP2 to the PDCP SN of the first PDCP PDU with PDCP SN≥VRX that has not been received, delivers the PDCP PDUs with PDCP SN<VRX to upper functional entity in ascending order of the PDCP SN, starts reordering timer if Higher edge>$NEP_{min}$.

Figure 17B:
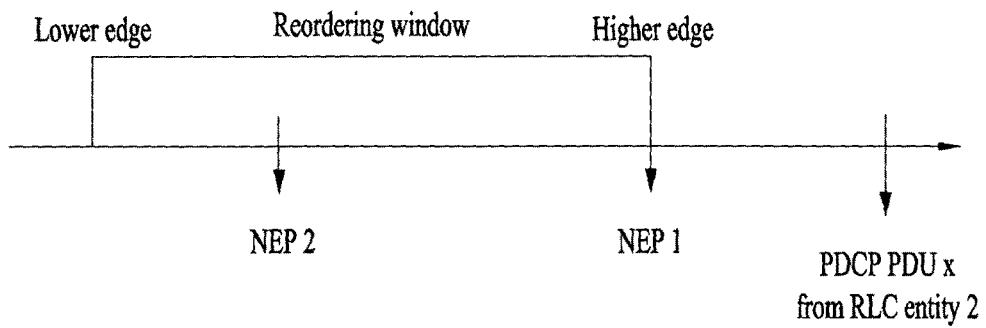

FIG. 17B represents a case of PDCP PDU received from RLC entity 2, and x≥NEP1>NEP2.

Regarding FIG. 17B, if the PDCP entity receives PDCP PDU with PDCP SN=x from the RLC entity 2, where the PDCP SN x is x≥NEP1, the PDCP entity stores the received PDCP PDU in the reordering buffer, updates NEP2 to x+1, considers the missing PDCP PDUs with PDCP SN where PDCP SN<$NEP_{min}$ (=NEP1) as lost, delivers the stored PDCP PDUs with PDCP SN where PDCP SN<$NEP_{min}$ (=NEP1) to upper functional entity in ascending order of PDCP SN, and update Higher edge to $NEP_{max}$ (=NEP2).

If NEP1 falls outside the reordering window, the PDCP entity considers the missing PDCP PDUs with PDCP SN where NEP1≤PDCP SN<Lower edge as lost, delivers the stored PDCP PDUs with PDCP SN where NEP1≤PDCP SN<Lower edge to upper functional entity in ascending order of PDCP SN, and updates NEP1 to Lower edge.

If the PDCP PDU with PDCP SN=NEP1 is stored, the PDCP entity delivers the consecutive PDCP PDUs with PDCP SN≥NEP1 to upper functional entity in ascending order of the PDCP SN and updates NEP1 to the PDCP SN of the first PDCP PDU with PDCP SN>NEP1 that has not been received.

If reordering timer is running and if VRX≤$NEP_{min}$; or if VRX falls outside of the reordering window and VRX is not equal to Higher edge, the PDCP entity stops and reset reordering timer.

If reordering timer is not running and if Higher edge>$NEP_{min}$, the PDCP entity starts reordering timer and sets VRX=Higher edge. If reordering timer expires or stops, the PDCP entity updates NEP1 and NEP2 to the PDCP SN of the first PDCP PDU with PDCP SN≥VRX that has not been received, delivers the PDCP PDUs with PDCP SN<VRX to upper functional entity in ascending order of the PDCP SN. If Higher edge>$NEP_{min}$, the PDCP entity starts reordering timer, and sets VRX=Higher edge.

Figure 17C:
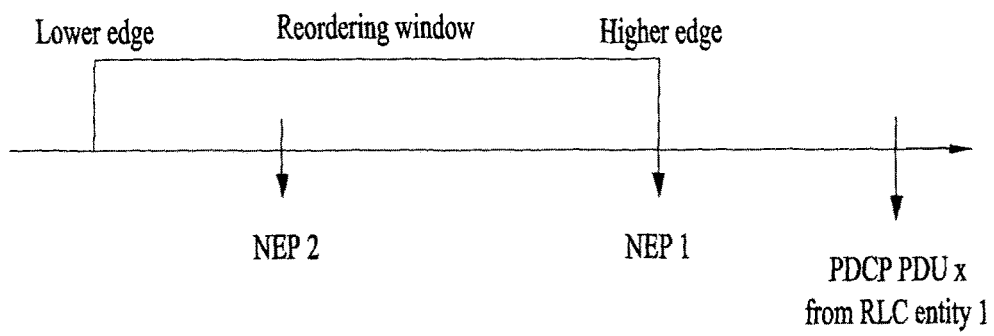

FIG. 17C represents a case of PDCP PDU received from RLC entity 1, and x≥NEP1>NEP2.

Regarding FIG. 17C, if the PDCP entity receives PDCP PDU with PDCP SN=x from the RLC entity 1, where the PDCP SN x is x≥NEP1, the PDCP entity stores the received PDCP PDU in the reordering buffer, updates NEP1 to x+1, updates Higher edge to $NEP_{max}$ (=NEP1).

If NEP2 falls outside the reordering window, the PDCP entity considers the missing PDCP PDUs with PDCP SN where NEP2≤PDCP SN<Lower edge as lost, delivers the stored PDCP PDUs with PDCP SN where NEP2≤PDCP SN<Lower edge to upper functional entity in ascending order of PDCP SN, update NEP2 to Lower edge.

If the PDCP PDU with PDCP SN=NEP2 is stored, the PDCP entity delivers the consecutive PDCP PDUs with PDCP SN≥NEP2 to upper functional entity in ascending order of the PDCP SN, updates NEP2 to the PDCP SN of the first PDCP PDU with PDCP SN>NEP2 that has not been received.

If reordering timer is running, if VRX≤$NEP_{min}$ and if VRX falls outside of the reordering window and VRX is not equal to Higher edge, the PDCP entity stops and reset reordering timer.

If reordering timer is not running and if Higher edge>$NEP_{min}$, the PDCP entity starts reordering timer and sets VRX=Higher edge.

If reordering timer expires or stops, the PDCP entity updates NEP1 and NEP2 to the PDCP SN of the first PDCP PDU with PDCP SN≥VRX that has not been received, and delivers the PDCP PDUs with PDCP SN<VRX to upper functional entity in ascending order of the PDCP SN. And if Higher edge>$NEP_{min}$, the PDCP entity starts reordering timer, and sets VRX=Higher edge.

Figure 17D:
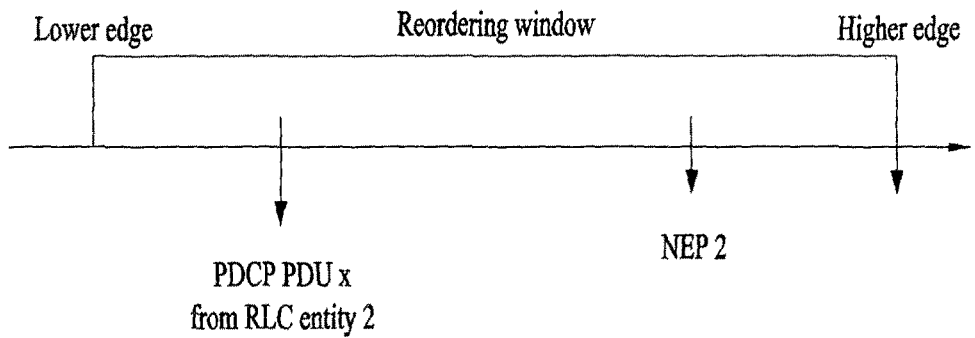
Figure 17E:
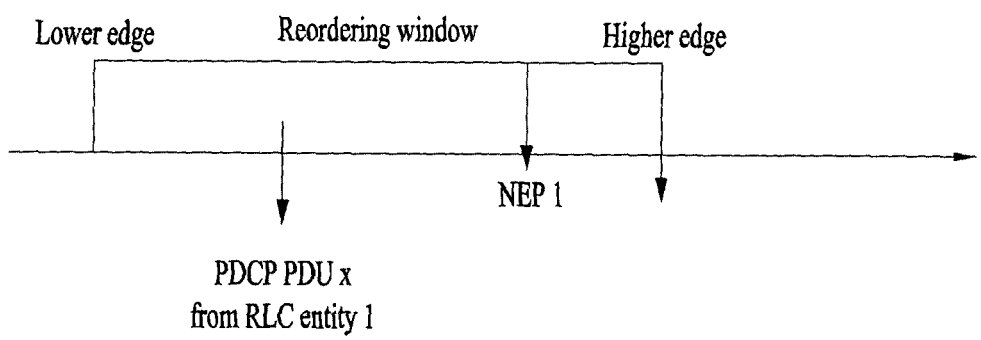

FIG. 17D represents a case of PDCP PDU received from RLC entity 2, and Lower Edge≤x<NEP2, and FIG. 17E represents a case of PDCP PDU received from RLC entity 1, and Lower Edge≤x<NEP1

Regarding FIGS. 17D and 17E, the PDCP entity discards the received PDCP PDU.

Figure 17F:
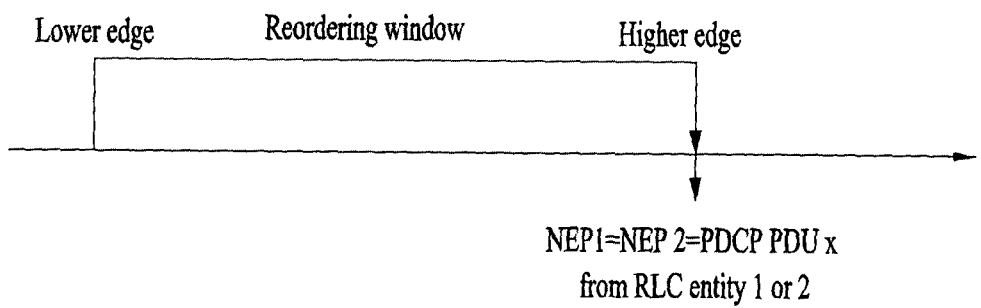

FIG. 17F represents a case of PDCP PDU received from RLC entity 1 or 2, NEP1=NEP2=Higher Edge, and x=Higher Edge.

Regarding FIG. 17F, the PDCP entity delivers the PDCP PDU to upper functional entity, updates NEP1 and NEP2 to x+1 and updates Higher edge to x+1.

Figure 17G:
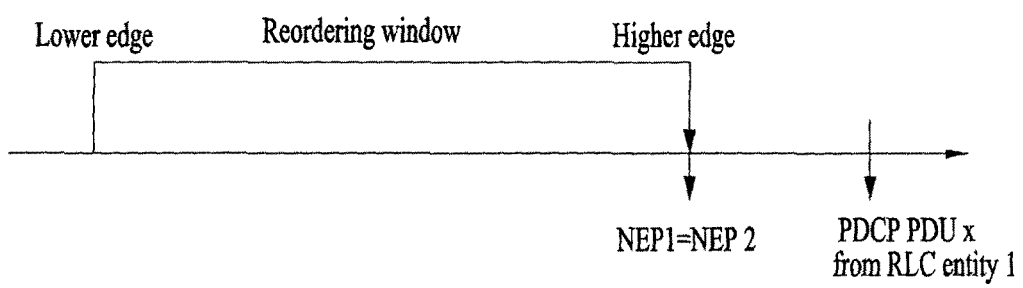

FIG. 17G represents a case of PDCP PDU received from RLC entity 1, NEP1=NEP2=Higher Edge, and x>Higher Edge.

Regarding FIG. 17G, the PDCP entity stores the received PDCP PDU in the reordering buffer, updates NEP1 to x+1, updates Higher edge to x+1, starts reordering timer, and sets VRX to x+1.

Figure 17H:
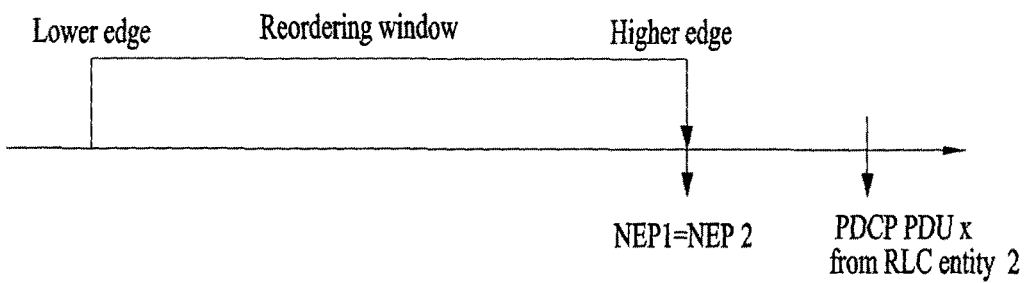

FIG. 17H represents a case of PDCP PDU received from RLC entity 2, NEP1=NEP2=Higher Edge, and x>Higher Edge.

Regarding FIG. 17H, the PDCP entity stores the received PDCP PDU in the reordering buffer, updates NEP2 to x+1, updates Higher edge to x+1, starts reordering timer and sets VRX to x+1.

Figure 18:
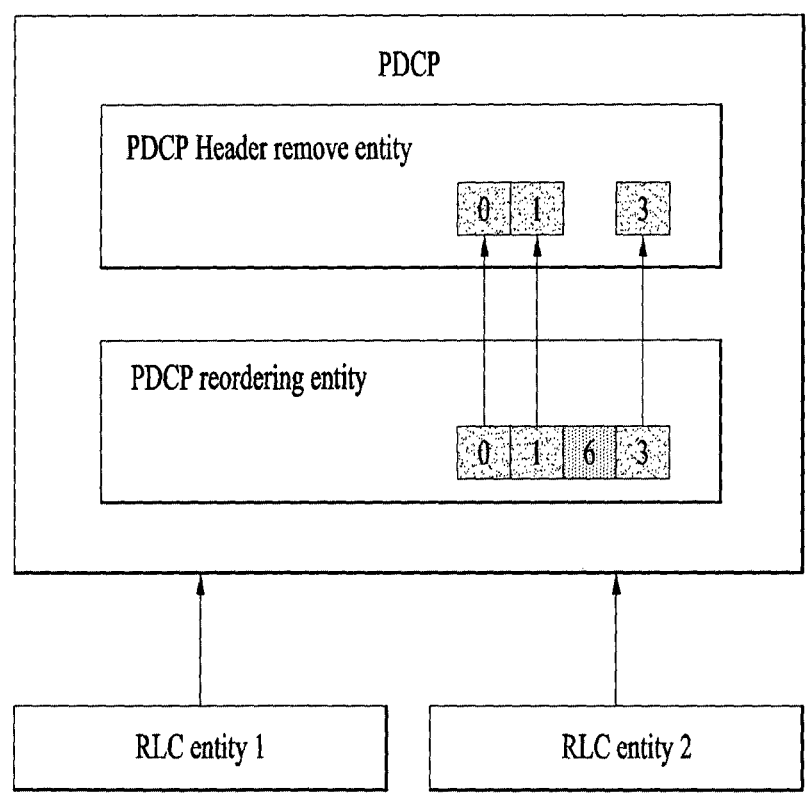
FIG. 18 is an example of flow for re-ordering PDCP PDU in a dual connectivity system according to embodiments of the present invention.

FIG. 18 an example of flow for re-ordering PDCP PDU in a dual connectivity system according to embodiments of the present invention.

1. NEP1=NEP2=0, Higher Edge=0;
2. The PDCP receives PDCP PDU with PDCP SN=0 from RLC entity 2 (Yellow box); the PDPC entity delivers the received PDCP PDU to upper functional entity, updates NEP1 and NEP2 to 1, and updates Higher Edge to 1 (case of FIG. 17F).
3. The PDCP receives PDCP PDU with PDCP SN=1 from RLC entity 2 (Yellow box); the PDPC entity delivers the received PDCP PDU to upper functional entity, updates NEP1 and NEP2 to 2, updates Higher Edge to 2 (case of FIG. 17F).
4. The PDCP receives PDCP PDU with PDCP SN=6 from RLC entity 1 (Green box), the PDCP entity stores the received PDCP PDU in the reordering buffer, updates NEP1 to 7, updates Higher edge to 7, starts reordering timer and sets VRX to 7 (case of FIG. 17G).
5. The PDCP receives PDCP PDU with PDCP SN=3 from RLC entity 2 (Yellow box); the PDCP entity stores the received PDCP PDU in the reordering buffer, updates NEP2 to 4, considers PDCP PDU with PDCP SN=2 as lost, an deliver PDCP PDU with PDCP SN=3 to upper functional entity (case of FIG. 17A).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a wireless communication system, the method comprising:
receiving, by a packet data convergence protocol (PDCP) entity, a PDCP protocol data unit (PDU) with a sequence number x from one (first lower layer entity) of two lower layer entities (first lower layer entity and second lower layer entity) associated with the PDCP entity;
updating a next expected PDCP sequence number (NEP) for the first lower layer entity (first NEP) to x+1, where the first NEP is a PDCP sequence number of a next expected PDCP PDU expected to be received in-sequence for the first lower layer entity;
delivering, to an upper entity by the PDCP entity, all stored PDCP PDU(s) with sequence number(s), which is(are) within a reordering window and smaller than a minimum value between the first NEP and a NEP for the second lower layer entity (second NEP), in ascending order of the sequence number(s) if not delivered before, where the second NEP is a PDCP sequence number of a next expected PDCP PDU expected to be received in-sequence for the second lower layer entity; and
updating the reordering window so that a higher edge of the reordering window is equal to a maximum value between the first NEP and the second NEP, where a lower edge of the reordering window is equal to the higher edge of the reordering window minus a size of the reordering window.

2. The method according to claim 1, wherein the PDCP entity delivers the stored PDCP PDU(s) to the upper entity before a timer associated with a reordering function expires or stops.

3. The method according to claim 1, wherein the PDCP entity discards stored PDCP PDU(s) with sequence number(s) outside the reordering window.

4. The method according to claim 1, wherein the two lower layer entities are radio link control (RLC) entities.

5. The method of claim 1,
wherein the receiving the PDCP PDU includes receiving and storing plural PDCP PDUs from the one of two lower layer entities, and
wherein the delivering all stored PDCP PDUs includes processing the delivered PDCP PDUs by the upper entity.

6. A UE (User Equipment) for operating in a wireless communication system, the UE comprising:
an RF (Radio Frequency) module; and
a processor configured to control the RF module, the processor configured to:
receive, at a packet data convergence protocol (PDCP) entity, a PDCP protocol data unit (PDU) with a sequence number x from one (first lower layer entity) of two lower layer entities (first lower layer entity and second lower layer entity) associated with the PDCP entity;
update a next expected PDCP sequence number (NEP) for the first lower layer entity (first NEP) to x+1, where the first NEP is a PDCP sequence number of a next expected PDCP PDU expected to be received in-sequence for the first lower layer entity;
deliver, to an upper entity from the PDCP entity, all stored PDCP PDU(s) with sequence number(s), which is(are) within a reordering window and smaller than a minimum value between the first NEP and a NEP for the second lower layer entity (second NEP), in ascending order of the sequence number(s) if not delivered before, where the second NEP is a PDCP sequence number of a next expected PDCP PDU expected to be received in-sequence for the second lower layer entity; and
update the reordering window so that a higher edge of the reordering window is equal to a maximum value between the first NEP and the second NEP, where a lower edge of the reordering window is equal to the higher edge of the reordering window minus a size of the reordering window.

7. The UE according to claim 6, wherein the processor is configured to deliver, at the PDCP entity, the stored PDCP PDU(s) to the upper entity before a timer associated with a reordering function expires or stops.

8. The UE according to claim 6, wherein the processor is configured to discard, at the PDCP entity, stored PDCP PDU(s) with sequence number(s) outside the reordering window.

9. The UE according to claim 6, wherein the two lower layer entities are radio link control (RLC) entities.

10. The UE of claim 6, wherein the processor is further configured to:
receive and store plural PDCP PDUs from the one of two lower layer entities, and
process the delivered PDCP PDUs.

* * * * *